United States Patent Office 3,330,615
Patented July 11, 1967

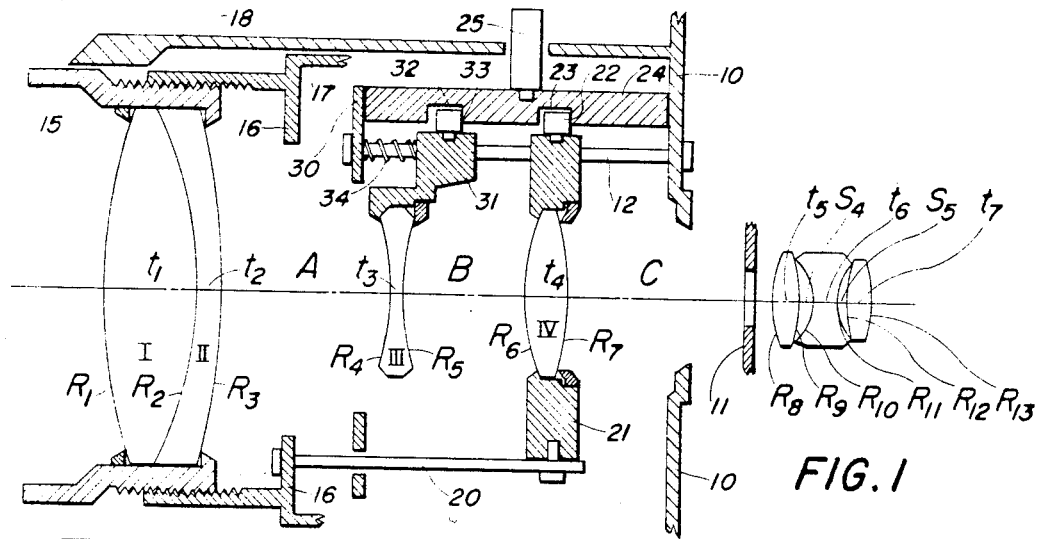

3,330,615
ZOOM LENS
William H. Price, Rochester, N.Y., assignor to Eastman Kodak Company, Rochester, N.Y., a corporation of New Jersey
Filed May 6, 1963, Ser. No. 278,203
4 Claims. (Cl. 350—187)

This invention relates to zoom lenses; that is, lenses with variable focal length.

The object of the invention is to provide an inexpensive zoom lens of high quality particularly for use with motion picture cameras. A particular object is to provide a high quality lens which is more compact than previous lenses of similar design.

The present lens belongs to that group of zoom lenses in which the system is made up of a main objective and three or more zooming components, two of which components have power of like sign and are rigidly connected to move as a unit, on opposite sides of a component of opposite sign. The present lens has three such components, the front one being a doublet positive component; the second relatively fixed component being a negative element and the third component, which is coupled to move with the first component, being a positive element. I have found that an unusually high degree of correction can be obtained with a lens of this system if the components have specifications within the ranges discussed below. This high degree of correction is obtained with the second component at a constant distance from the main objective, but still higher quality is obtained if the second component also moves back and forth slightly during zooming. With this added feature, the present relatively inexpensive lens produces a high quality previously obtainable only with the most expensive zoom systems. In fact, the gain in quality is so great that a little of the gain may be sacrificed in favor of other desirable qualities. For one thing, it is possible to introduce much stronger surfaces without having aberrations become intolerable. The stronger surfaces result in a somewhat more compact lens for a given focal length and aperture. Also the main objective can be of less expensive structure as discussed below or the lens can operate at higher aperture.

The main objective may have any form, and a preferred embodiment of the invention uses a simple triplet. In fact, it has been found possible to obtain quite high correction of the various aberrations when the main objective consists of a thick negative element between and in edge contact with both positive elements. The edge contact feature provides quite inexpensive construction.

One convention for describing the characteristics of a zoom lens is to describe them with reference to the mean focal length F of the total range. This is a meaningful convention since, if the geometric mean of the limiting values of the focal length is selected as the reference, the aberrations tend to change by about the same amount as one moves "geometrically" away from such reference toward either longer or shorter focal lengths. This convention will be adopted here, and the invention will be described with respect to a lens whose range is 3 to 1 in focal length. That is, if the mean focal length is F, the range is about .58F to 1.73F.

Some principles of relationships of zoom lenses have been established in algebraic formulation; others can be. It is useful in connection with the present type of zoom lens to utilize the relationships between the focal lengths or powers of the first three components and their axial settings and motions. As far as the broad concepts are concerned, the main lens can be considered merely as an extra to bring the light to focus at the desired magnification:

$f_{\text{II}}$, $f_{\text{III}}$, and $f_{\text{IV}}$ are the focal lengths respectively of the first three components.

X is the distance between (a) the rear focus of the front component (i.e. the focus to the right of the component in the accompanying drawing) and (b) the front focus of the second component (i.e. again the focus to the right of the component since this is a negative component)—measured at the longest focal length position. X is considered positive when said rear focus (a) of the front component is behind (i.e. to the right of) said front focus (b) of the second component.

S is the distance between the rear focus of the second component and the front focus of the third component—also at the longest focal length position, and S is considered positive when the rear focus of the second component is in front of the front focus of the third component.

R is the ratio of the longest compensated focal length to the shortest compensated (i.e. constant image position) focal length.

2D is the travel of the first and third components from the longest to the shortest focal length positions. At a point half-way between these two positions (i.e. for a travel distance of one D) there is another compensated position. Since one may do the computations in any desired units, it is sometimes convenient to take D equal to unity and eventually to convert the results to inches, millimeters or other desired units.

$f_{\text{III}}$ is negative and $f_{\text{III}}^2 = \dfrac{(X+2D)(S+2D) - RXS}{R-1}$ $f_{\text{IV}}$ is positive and $f_{\text{IV}}^2 = \dfrac{(f_{\text{III}}^2 + SX)(X+S+3D)}{X}$ Of course, D and R are specified requirements. In the present case one selected a zoom ratio $R=2.5$ with a movement 2D about equal to F or slightly larger. $R=2.5$ has been found to give better corrections over a total range of 3:1 than would be obtained if $R=3$ were used in the equations; the latter would be useful over a range of about 3.5:1 but not as well corrected.

X and S are not independent. If D is taken as unity, I have found that:

$$S = \dfrac{X^2(R-1) + X(R-5) - 6}{X(1-R) + 2}$$

Also X and S are selected to give reasonable size and spacings to the components. Since to permit a total travel of 2D, the front component must be more than 2D in front of the second component, at the longest focal length setting, and since its rear focus at said setting is fixed by the value of X, the focal length of the front component cannot be less than $2D+X-f_{\text{III}}$. Also for compactness this focal length $f_{\text{I II}}$ should not be much greater than this minimum—just enough greater to prevent contact of the components at the shortest focal length setting.

None of these algebraic relationships assure that the resultant lens will be of acceptable quality; they are merely inherent relationships of compensated zoom lenses of the present general type. The present invention, on the other hand, does provide a highly corrected zoom system of high relative aperture and high quality over a zoom range of 3:1. Furthermore, the system is of very low cost and contains a minimum of elements.

According to the present invention, the main objective has a focal length between .6F and 1.4F, and the three components made up of a doublet and two singlets have specifications within the following ranges, where R is the radius of curvature of the surfaces numbered from the front (i.e. long conjugate side), $N_D$ is the index of refraction for the D line and V is the dispersive index:

| | |
|---|---|
| $R_1$ | 3F to 5F |
| $R_2$ | −F to −3F |
| $R_3$ | −4F to −7F |
| $R_4$ | −1.5F to −4F |
| $R_5$ | F to 2F |
| $R_6$ | F to 2F |
| $R_7$ | −2F to −10F |

| | | |
|---|---|---|
| Lens I | $N_D$=1.5 to 1.6 | V=55 to 65. |
| Lens II | $N_D$=1.6 to 1.7 | V=32 to 38. |
| Lens III | $N_D$=1.5 to 1.75 | V=50 to 60. |
| Lens IV | $N_D$=1.5 to 1.75 | V=55 to 70. |

A most preferred embodiment of the present invention has the second component slightly movable during zooming, i.e. movable a distance less than 0.1F. The second component is farthest from the main objective at the long focal length end of the zoom range and is nearest the main objective at a point in the zoom range when the focal length is about F, i.e. is at about the mean value.

The small motion introduced in the second component compensates for slight variations in the plane of best focus which are due to two causes, namely the small variations of aberrations throughout the zoom and the cubic variation of the paraxial focus of the zoom system: Thus the film remains in the best focal plane of the lens at all zoom positions.

While the above specifications provide an acceptable lens, the advantages of the present invention are realized most fully when the specifications are within a much narrower range of values, namely those given below. These preferred values allow a shorter focal length lens to be used as the main objective.

| | |
|---|---|
| $R_1$ | 4F to 5F |
| $R_2$ | −1.5F to −2F |
| $R_3$ | −4F to −5F |
| $R_4$ | −1.5F to −2F |
| $R_5$ | 1.25F to 1.5F |
| $R_6$ | 1.4F to 2F |
| $R_7$ | −2F to −10F |

| | | |
|---|---|---|
| Lens I | $N_D$=1.55 to 1.60 | V=55 to 60. |
| Lens II | $N_D$=1.64 to 1.67 | V=32 to 36. |
| Lens III | $N_D$=1.60 to 1.75 | V=50 to 57. |
| Lens IV | $N_D$=1.60 to 1.75 | V=55 to 60. |

As is customary with zoom lenses, either the system as a whole or one of the three components (or the main objective) may be axially adjusted to focus on objects at different distances. In each of the examples given below it is convenient to move the front component separately for focusing. The values given are for the infinity setting of the front component. Movement of the front component forward independently focuses for nearer objects and a total movement of about .25F will focus down to objects at 80F (i.e. to 5 feet when F is about 0.7 inch).

Various preferred embodiments of the invention are described below with reference to the accompanying drawings in which:

FIG. 1 schematically shows a lens system incorporating a preferred embodiment of the invention and the essential features of the zooming mechanism.

FIG. 2 gives the optical specifications for the preferred embodiment of the invention; namely Example 1 below.

In FIG. 1 the lens elements are designated I, II, III, IV, V, VI and VII with the radii of curvature of the surfaces, the axial thicknesses and spacings being identified respectively by R, $t$ and $s$, the variable spaces being labelled A, B and C having values given in FIG. 2.

A portion of the main housing of the camera is shown at 10. The main objective made up of elements V, VI and VII is mounted rigidly, by means not shown, within the housing 10, and the diaphragm also mounted within the housing is shown at 11. Two of the three zooming components are mounted for axial movement on rods, one of which is shown at 12, which rods are rigidly attached to the camera housing 10. The first component made up of lenses I and II is also mounted for axial movement the lens mount 15 carrying this front component is threaded into a sleeve and ring 16, the outer portion of which, 17, is shown broken away. This outer portion slides in the outer cover sleeve 18 of the lens mount.

The first and third components are connected to move axially as a unit. A rod 20 extending from the sleeve and ring 16 is rigidly attached to the mount 21 carrying the third component (made up of lens element IV). This lens mount 21 also includes a stud or groove follower 22 extending into a groove 23 in a rotatable sleeve 24. The sleeve 24 can be rotated manually about 60° to 90° about the optic axis, by means of a handle or lever 25 extending through a slot in the outer mount 18. The sleeve 24 is prevented from axial movement by being held between the camera housing 10 and a ring 30 rigidly attached to the housing 10 by the rod 12. Rotation of the sleeve 24 with its spiral groove 23 causes the stud 22, and hence both the front and third components of the lens system, to move axially as a unit.

The sleeve 24 is provided with a second groove or cam surface 33 against which a cam follower 32 is urged by a spring 34 pressing against the mount 31 which is the mount for the second component of the system. The cam surface 33 provides a slight back and forth movement of the second component as the sleeve 34 is rotated through the full zooming range. The movement of this second component is less than 0.1F.

The following five examples of the invention are described with the middle component fixed, except that Example 1 illustrates how this middle component is moved slightly in the most preferred embodiment to provide an extra high degree of correction.

EXAMPLE 1

Mean F=100mm.   $f_{V\ VI\ VII}$=89mm.   f/1.9

| Lens | $N_D$ | V | Radii | Spacings |
|---|---|---|---|---|
| I | 1.573 | 57.4 | $R_1$ = +423 mm. | $t_1$=48.0 mm. |
| II | 1.649 | 33.8 | $R_2$ = −166 | $t_2$=11.6 |
| | | | $R_3$ = −414 | $s_1$=A |
| III | 1.617 | 54.9 | $R_4$ = −185 | $t_3$=9.6 |
| | | | $R_5$ = +129 | $s_2$=B |
| IV | 1.638 | 55.5 | $R_6$ = +145 | $t_4$=20.5 |
| | | | $R_7$ = −306 | $s_3$=C |
| V | 1.611 | 58.8 | $R_8$ = +55 | $t_5$=10.8 |
| | | | $R_9$ = −130 | $s_4$=1.8 |
| VI | 1.649 | 33.8 | $R_{10}$ = −64 | $t_6$=20.0 |
| | | | $R_{11}$ = +46 | $s_5$=2.0 |
| VII | 1.611 | 58.8 | $R_{12}$ = +76 | $t_7$=13.2 |
| | | | $R_{13}$ = −51 | BF=48.5 |

With fixed second component

| EF, mm. | A, mm. | B, mm. | C, mm. |
|---|---|---|---|
| 173 | 137 | 14 | 143 |
| 165 | 133 | 18 | 139 |
| 130 | 110 | 41 | 116 |
| 103 | 88 | 63 | 94 |
| 82 | 65 | 86 | 71 |
| 66 | 42 | 109 | 48 |
| 58 | 29 | 122 | 35 |

With movable second component

| EF, mm. | A, mm. | B, mm. | C, mm. |
|---|---|---|---|
| 173 | 133 | 17 | 143 |
| 165 | 129 | 22 | 139 |
| 130 | 109 | 42 | 116 |
| 103 | 91 | 60 | 94 |
| 82 | 69 | 82 | 71 |
| 66 | 44 | 106 | 48 |
| 58 | 29 | 122 | 35 |

This Example 1 gives a very high degree of correction throughout its range. It is an $f/1.9$ lens which is unusually inexpensive to manufacture.

EXAMPLE 2
Mean F=100 mm.    $f_{V\ VI\ VII}$=99 mm.    $f/1.6$

| Lens | $N_D$ | V | Radii | Spacings |
|---|---|---|---|---|
| I | 1.573 | 57.4 | $R_1 = +427$ mm. | $t_1 = 59.0$ mm. |
| II | 1.649 | 33.8 | $R_2 = -217$ | $t_2 = 19.2$ |
|  |  |  | $R_3 = -623$ | $s_1 = A$ |
| III | 1.734 | 51.0 | $R_4 = -320$ | $t_3 = 12.0$ |
|  |  |  | $R_5 = +161$ | $s_2 = B$ |
| IV | 1.697 | 56.2 | $R_6 = +186$ | $t_4 = 26.1$ |
|  |  |  | $R_7 = -576$ | $s_3 = C$ |
| V | 1.611 | 58.8 | $R_8 = +58$ | $t_5 = 14.4$ |
|  |  |  | $R_9 = -192$ | $s_4 = 3.6$ |
| VI | 1.649 | 33.8 | $R_{10} = -71$ | $t_6 = 11.7$ |
|  |  |  | $R_{11} = +54$ | $s_5 = 2.1$ |
| VII | 1.611 | 58.8 | $R_{12} = +86$ | $t_7 = 14.7$ |
|  |  |  | $R_{13} = -59$ | BF = 57.7 |

With fixed second component

| EF, mm. | A, mm. | B, mm. | C, mm. |
|---|---|---|---|
| 173 | 162 | 48 | 184 |
| 164 | 157 | 53 | 179 |
| 129 | 128 | 82 | 150 |
| 102 | 100 | 110 | 122 |
| 82 | 72 | 138 | 94 |
| 65 | 44 | 166 | 66 |
| 58 | 27 | 173 | 49 |

This Example 2 is an $f/1.6$ lens with adequate space behind the third component for a reflex finder even when made up as a 9 to 27 mm. zone lens for an 8 mm. movie camera.

EXAMPLE 3
Mean F=100 mm.    $f_{V\ VI\ VII}$=91.5 mm.    $f/1.6$

| Lens | $N_A$ | V | Radii | Spacings |
|---|---|---|---|---|
| I | 1.573 | 57.4 | $R_1 = +433$ mm. | $t_1 = 57.7$ mm. |
| II | 1.649 | 33.8 | $R_2 = -210$ | $t_2 = 17.1$ |
|  |  |  | $R_3 = -587$ | $s_1 = A$ |
| III | 1.734 | 51.0 | $R_4 = -314$ | $t_3 = 12.9$ |
|  |  |  | $R_5 = +169$ | $s_2 = B$ |
| IV | 1.697 | 56.2 | $R_6 = +157$ | $t_4 = 23.7$ |
|  |  |  | $R_7 = -846$ | $s_3 = C$ |
| V | 1.697 | 56.2 | $R_8 = +64$ | $t_5 = 13.9$ |
|  |  |  | $R_9 = -222$ | $s_4 = 3.6$ |
| VI | 1.615 | 31.9 | $R_{10} = -71$ | $t_6 = 10.4$ |
|  |  |  | $R_{11} = +42$ | $s_5 = 8.4$ |
| VII | 1.611 | 58.8 | $R_{12} = +77$ | $t_7 = 16.7$ |
|  |  |  | $R_{13} = -55$ | BF = 57.3 |

With fixed second component

| EF, mm. | A, mm. | B, mm. | C, mm. |
|---|---|---|---|
| 175 | 150 | 19 | 165 |
| 165 | 143 | 26 | 158 |
| 130 | 116 | 53 | 131 |
| 103 | 88 | 91 | 103 |
| 82 | 61 | 108 | 76 |
| 66 | 33 | 136 | 48 |
| 57 | 16 | 153 | 31 |

This Example 3 is also an $f/1.6$ lens and is more compact than Example 2, with corrections at least as good as those of Example 2.

EXAMPLE 4
Mean F=100 mm.    $f_{V\ VI\ VII}$=97.5 mm.    $f/2.3$

| Lens | $N_D$ | V | Radii | Spacings |
|---|---|---|---|---|
| I | 1.573 | 57.4 | $R_1 = +483$ mm. | $t_1 = 57.5$ mm. |
| II | 1.649 | 33.8 | $R_2 = -199$ | $t_2 = 16.0$ |
|  |  |  | $R_3 = -506$ | $s_1 = A$ |
| III | 1.617 | 54.9 | $R_4 = -224$ | $t_3 = 12.7$ |
|  |  |  | $R_5 = +156$ | $s_2 = B$ |
| IV | 1.638 | 55.5 | $R_6 = +173$ | $t_4 = 25.5$ |
|  |  |  | $R_7 = -386$ | $s_3 = C$ |
| V | 1.611 | 58.8 | $R_8 = +56$ | $t_5 = 10.9$ |
|  |  |  | $R_9 = -193$ | $s_4 = 1.8$ |
| VI | 1.649 | 33.8 | $R_{10} = -69$ | $t_6 = 5.1$ |
|  |  |  | $R_{11} = +53$ | $s_5 = 1.4$ |
| VII | 1.611 | 58.8 | $R_{12} = +82$ | $t_7 = 12.5$ |
|  |  |  | $R_{13} = -58$ | BF = 61.9 |

With fixed second component

| EF, mm. | A, mm. | B, mm. | C, mm. |
|---|---|---|---|
| 173 | 152 | 16 | 163 |
| 164 | 146 | 22 | 157 |
| 130 | 119 | 49 | 130 |
| 103 | 91 | 77 | 102 |
| 82 | 64 | 104 | 75 |
| 65 | 37 | 131 | 48 |
| 58 | 20 | 148 | 31 |

This Example 4 is designed to have superior correction throughout the zooming range, but has a maximum aperture of only $f/2.3$.

Having thus described the preferred embodiments of my invention, I wish to point out that the invention is of the scope of the appended claims.

The embodiments of the invention in which an exclusive property or privilege is claimed are defined as follows:

1. A zoom lens system with a geometrical mean focal length F, comprising in optical alignment a front zooming member and a rear relay objective member, said front zooming member comprising three components, the front first component being a doublet of lens elements I and II and the second and third components being single lens elements III and IV, the first and third components being coupled to each other at an axial distance of substantially 1.61F from each other and axially movable as a unit for zooming, the second component being held at a distance of substantially 1.77F from the rear objective, said distance being substantially constant within 0.1F during zooming, said rear relay objective member having a focal length of substantially .89F and comprising three single airspaced lens elements V, VI and VII, the seven lens elements having substantially the following specifications, where R is the radius of curvature of the surfaces numbered from the front, $t$ and $s$ are the thickness and spacings respectively of the lens elements numbered from the front. $N_D$ is the index of reflection for the D line and V is the dispersive index:

| Lens | $N_D$ | V | Radii | Thicknesses and Spacings |
|---|---|---|---|---|
| I | 1.57 | 57.4 | $R_1 = 4.23F$ | $t_1 = .480F$ |
| II | 1.65 | 33.8 | $R_2 = -1.66F$ | $t_2 = .116F$ |
|  |  |  | $R_3 = -4.14F$ | $s_1$ varies. |
| III | 1.62 | 54.9 | $R_4 = -1.85F$ | $t_3 = .096F$ |
|  |  |  | $R_5 = 1.29F$ | $s_2$ varies. |
| IV | 1.64 | 55.5 | $R_6 = 1.45F$ | $t_4 = .205F$ |
|  |  |  | $R_7 = -3.06F$ | $s_3$ varies. |
| V | 1.61 | 58.8 | $R_8 = .55F$ | $t_5 = .108F$ |
|  |  |  | $R_9 = -1.30F$ | $s_4 = .018F$ |
| VI | 1.65 | 33.8 | $R_{10} = -.64F$ | $t_6 = .200F$ |
|  |  |  | $R_{11} = .46F$ | $s_5 = .020F$ |
| VII | 1.61 | 58.8 | $R_{12} = .78F$ | $t_7 = .132F$ |
|  |  |  | $R_{13} = -.51F$ |  |

2. A zoom lens system with a geometrical mean focal length F, comprising in optical alignment a front zooming member and a rear relay objective member, said front zooming member comprising three components, the front first component being a doublet of lens elements I and II and the second and third components being single lens elements III and IV, the first and third components being coupled to each other at an axial distance of substantially 2.22F from each other and axially movable as a unit for zooming, the second component being held at a distance of substantially 2.58F from the rear objective said distance being substantially constant within 0.1F during zooming, said rear relay objective member having a focal length of substantially .99F and comprising three single airspaced lens elements V, VI and VII, the seven lens elements having substantially the following specifications, where R is the radius of curvature of the surfaces numbered from the front, $t$ and $s$ are the thickness and spacings respectively of the lens elements numbered from the front, $N_D$ is the index of refraction for the D line and V is the dispersive index:

| Lens | $N_D$ | V | Radii | Thicknesses and Spacings |
|---|---|---|---|---|
| I | 1.57 | 57.4 | $R_1 = 4.27F$ | $t_1 = .590F$ |
| II | 1.65 | 33.8 | $R_2 = -2.17F$ | $t_2 = .192F$ |
|  |  |  | $R_3 = -6.23F$ | $s_1$ varies. |
| III | 1.73 | 51.0 | $R_4 = -3.20F$ | $t_3 = .120F$ |
|  |  |  | $R_5 = 1.61F$ | $s_2$ varies. |
| IV | 1.70 | 56.2 | $R_6 = 1.86F$ | $t_4 = .261F$ |
|  |  |  | $R_7 = -5.76F$ | $s_3$ varies. |
| V | 1.61 | 58.8 | $R_8 = .58F$ | $t_5 = .144F$ |
|  |  |  | $R_9 = -1.92F$ | $s_4 = .036F$ |
| VI | 1.65 | 33.8 | $R_{10} = -.71F$ | $t_6 = .117F$ |
|  |  |  | $R_{11} = .64F$ | $s_5 = .021F$ |
| VII | 1.61 | 58.8 | $R_{12} = .86$ | $t_7 = .147F$ |
|  |  |  | $R_{13} = -.59$ |  |

3. A zoom lens system with a geometrical mean focal length F, comprising in optical alignment a front zooming member and a rear relay objective member, said front zooming member comprising three components, the front first component being a doublet of lens elements I and II and the second and third components being single lens elements III and IV, the first and third components being coupled to each other at an axial distance of substantially 1.82F from each other and axially movable as a unit for zooming, the second component being held at a distance of substantially 2.08F from the rear objective said distance being substantially constant within 0.1F during zooming, said rear relay objective member having a focal length of substantially 91.5F and comprising three single airspaced lens elements V, VI and VII, the seven lens elements having substantially the following specifications, where R is the radius of curvature of the surfaces numbered from the front, $t$ and $s$ are the thickness and spacings respectively of the lens elements numbered from the front, $N_D$ is the index of refraction for the D line and V is the dispersive index:

| Lens | $N_D$ | V | Radii | Thicknesses and Spacings |
|---|---|---|---|---|
| I | 1.57 | 57.4 | $R_1 = 4.33F$ | $t_1 = .577F$ |
|   |      |      | $R_2 = -2.10F$ |  |
| II | 1.65 | 33.8 | $R_3 = -5.87F$ | $t_2 = .171F$ |
|   |      |      |                | $s_1$ varies. |
| III | 1.73 | 51.0 | $R_4 = -3.14F$ | $t_3 = .129F$ |
|   |      |      | $R_5 = 1.69F$ |  |
|   |      |      |               | $s_2$ varies. |
| IV | 1.70 | 56.2 | $R_6 = 1.57F$ | $t_4 = .237F$ |
|   |      |      | $R_7 = -8.46F$ |  |
|   |      |      |                | $s_3$ varies. |
| V | 1.70 | 56.2 | $R_8 = .64F$ | $t_5 = .139F$ |
|   |      |      | $R_9 = -2.22F$ |  |
|   |      |      |                | $s_4 = .026F$ |
| VI | 1.62 | 31.9 | $R_{10} = -.71F$ | $t_6 = .104F$ |
|   |      |      | $R_{11} = .42F$ |  |
|   |      |      |                 | $s_5 = .084F$ |
| VII | 1.61 | 58.8 | $R_{12} = .77F$ | $t_7 = .167F$ |
|   |      |      | $R_{13} = -.55F$ |  |

4. A zoom lens system with a geometrical mean focal length F, comprising in optical alignment a front zooming member and a rear relay objective member, said front zooming member comprising three components, the front first component being a doublet of lens elements I and II and the second and third components being single lens elements III and IV, the first and third components being coupled to each other at an axial distance of substantially 1.81F from each other and axially movable as a unit for zooming, the second component being held at a distance of substantially 2.05F from the rear objective said distance being substantially constant within 0.1F during zooming, said rear relay objective member having a focal length of substantially 97.5F and comprising three single airspaced lens elements V, VI and VII, the seven lens elements having substantially the following specifications, where R is the radius of curvature of the surfaces numbered from the front, $t$ and $s$ are the thickness and spacings respectively of the lens elements numbered from the front, $N_D$ is the index of refraction for the D line and V is the dispersive index:

| Lens | $N_D$ | V | Radii | Thicknesses and Spacings |
|---|---|---|---|---|
| I | 1.57 | 57.4 | $R_1 = 4.83F$ | $t_1 = .575F$ |
|   |      |      | $R_2 = -1.99F$ |  |
| II | 1.65 | 33.8 | $R_3 = -5.06F$ | $t_2 = .160F$ |
|   |      |      |                | $s_1$ varies. |
| III | 1.62 | 54.9 | $R_4 = -2.24F$ | $t_3 = .127F$ |
|   |      |      | $R_5 = 1.56F$ |  |
|   |      |      |               | $s_2$ varies. |
| IV | 1.64 | 55.5 | $R_6 = 1.73F$ | $t_4 = .255F$ |
|   |      |      | $R_7 = -3.86F$ |  |
|   |      |      |                | $s_3$ varies. |
| V | 1.61 | 58.8 | $R_8 = .56$ | $t_5 = .109F$ |
|   |      |      | $R_9 = -1.93F$ |  |
|   |      |      |                | $s_4 = .018F$ |
| VI | 1.65 | 33.8 | $R_{10} = -.69F$ | $t_6 = .051F$ |
|   |      |      | $R_{11} = .53F$ |  |
|   |      |      |                 | $s_5 = .014F$ |
| VII | 1.61 | 58.8 | $R_{12} = .82F$ | $t_7 = .125F$ |
|   |      |      | $R_{13} = -.58F$ |  |

References Cited
UNITED STATES PATENTS

| | | | |
|---|---|---|---|
| 2,908,199 | 10/1959 | Kaprelian | 88—57 |
| 2,925,010 | 2/1960 | Turula et al. | 88—57 |
| 3,194,139 | 7/1965 | Babcock | 88—57 |
| 3,220,307 | 11/1965 | Thurow | 88—57 |

JEWELL H. PEDERSEN, *Primary Examiner.*

R. J. STERN, *Assistant Examiner.*

UNITED STATES PATENT OFFICE
CERTIFICATE OF CORRECTION

Patent No. 3,330,615                 July 11, 1967

William H. Price

It is hereby certified that error appears in the above numbered patent requiring correction and that the said Letters Patent should read as corrected below.

Column 7, line 43, for "front." read -- front, --; column 8, in the table, fourth column, line 11 thereof, for "$R_{11}$= .64F" read -- $R_{11}$= .54F --; same column, line 12 thereof, for "$R_{12}$=.86" read -- $R_{12}$=.86F --; same table, same column 4, line 13 thereof, for "$R_{13}$= -.59" read -- $R_{13}$=-.59F --.

Signed and sealed this 25th day of June 1968.

(SEAL)
Attest:

Edward M. Fletcher, Jr.
Attesting Officer

EDWARD J. BRENNER
Commissioner of Patents